Patented Oct. 23, 1951

2,572,565

UNITED STATES PATENT OFFICE 2,572,565

TERTIARY-ALKYLSULFENYL THIOCYANATES

Chester M. Himel and Lee O. Edmonds, Bartlesville, Okla., assignors to Phillips Petroleum Company, a corporation of Delaware No Drawing. Application December 21, 1948,
Serial No. 66,584

8 Claims. (Cl. 260—454)

This invention relates to new and useful compositions of matter comprising tertiary-alkylsulfenyl thiocyanates, and to their preparation.

The products of this invention are useful for various commercial purposes. Thus, they may be used as pest-control agents, e. g., insecticides, bactericides, fungicides, and as intermediates in the preparation of other chemical compounds. The compounds prepared by the present invention are particularly remarkable and useful by reason of their stability.

Primary and secondary alkyl sulfenyl thiocyanates have been prepared but are difficult to recover and cannot be satisfactorily purified since they decompose easily during distillative operations to remove solvents, contaminating substances, etc. These compounds, and especially those of primary alkyl configuration, decompose noticeably even upon standing in storage under normal conditions. The compounds of the present invention are, however, stable under fairly drastic conditions, as shown hereinafter. In view of the unstable characteristic of the related known compounds, the high degree of stability of the present novel tertiary-alkylsulfenyl thiocyanates is entirely unexpected and unpredictable. For example, tertiary-butylsulfenyl thiocyanate is not substantially decomposed after refluxing in cyclohexane at 80° C. for many hours and is only mildly affected upon boiling in the presence of a strong acid or of a strong base.

The compounds of the present invention have the general formula R—S—SCN, in which R represents a tertiary alkyl group of the configuration

wherein R′, R″, and R‴ are similar or different alkyl groups. While the invention is adaptable for the preparation of tertiary-alkylsulfenyl thiocyanates of innumerable carbon atoms, it is especially applicable to the preparation of those thiocyanates in which the tertiary alkyl group, R, has from four to twenty carbon atoms. The compounds included in the present invention also include substituted alkyl derivatives. These novel thiocyanates are produced in good yield from the interaction of the corresponding tertiary-alkylsulfenyl halide with selected metal salts of thiocyanic acid. A preferred manner of preparation comprises dissolving a tertiary-alkylsulfenyl halide in an organic solvent, preferably a low-boiling hydrocarbon and adding to this solution a molar equivalent amount of a metal salt of thiocyanic acid which may conveniently be added as an aqueous solution thereof, since the reaction proceeds rapidly. The term "halide" as used herein and in the claims is meant to include only chlorine, bromine, and iodine. The mixture is stirred until the reaction is complete which is usually from about 0.5 to 1.5 hours. Upon the completion of the reaction, the solvent is removed by distillation and the product recovered by fractionation, preferably at a reduced pressure.

The tertiary-alkylsulfenyl halides employed for the process may be obtained from any suitable source or can be prepared as used. These reactants may be prepared by the interaction of the corresponding mercaptans or disulfides with elemental halogen at moderate temperatures. The interaction of the mercaptans or disulfides and the halogen is preferably conducted in the presence of a low-boiling hydrocarbon solvent which may conveniently be a solvent which is satisfactory for the reaction forming the thiocyanates of the present invention. It is preferred not to attempt to recover the sulfenyl halides from the solvent in which they are prepared inasmuch as the compounds are relatively unstable. The tertiary-alkysulfenyl halides employed in the present process to prepare the sulfenyl thiocyanates are preferably the chlorides, although the bromides and iodides are applicable. The metal salts of thiocyanic acid with which the sulfenyl halides are reacted are preferably the alkali metal salts, although the salts of the alkaline earths may also be employed. It is generally preferred to employ sodium or potassium thiocyanate because these compounds are relatively cheap and readily available. In the process these metal thiocyanate salts are generally employed as an aqueous solution.

The solvent used for the reaction medium and in which the halides may be initially dissolved is preferably a low-boiling hydrocarbon or mixture of hydrocarbons which are preferred because of their low cost and ease of handling; however, other inert organic solvents such as diethyl ether, chloroform, benzene, and similar materials may be used when desired. It is, of course, essential that the solvent selected be inert with respect to both of the reactants and to the product.

The conditions for the reaction are limited, but excellent conversion can be obtained by operating at room temperature and atmospheric pressure. However, temperatures between —10° and 50° C. and pressure somewhat above or below atmospheric may be used if desired. It is particularly efficacious to employ as a solvent a low-boiling hydrocarbon such as pentane and to carry out the reaction at the boiling temperature of the solvent and in the presence of refluxing solvent. By operating in this manner a constant temperature level is maintained and a certain degree of agitation of the system is automatically provided.

The following examples illustrate particular applications of the invention and conditions under which the particular tertiary-alkylsulfenyl thiocyanates may be prepared. Other examples are given to show the stability of the tertiary-alkylsulfenyl thiocyanates under rather drastic conditions.

Example I

A solution of 102 grams of tertiary-butylsulfenyl chloride in isopentane was placed in a reactor fitted with a mechanical stirrer and reflux condenser. To this solution was added 80 grams of potassium thiocyanate dissolved in 200 ml. of water. Heat was slowly evolved and the characteristic color of the sulfenyl chloride disappeared as the reaction between the sulfenyl chloride and the thiocyanate proceeded. Stirring of the mixture was continued for 45 minutes and the mixture was removed from the reactor. The mixture was allowed to separate and the non-aqueous layer recovered. The isopentane solvent was removed by distillation from this layer and the resulting liquid was fractionated under reduced pressure. The tertiary-butylsulfenyl thiocyanate product was a light green liquid which was strongly lachrymatory and had a boiling point of 53° C. at 4 mm. pressure and an index of refraction of $n_D^{20}$ 1.5085. Yield of the thiocyanate product was 117 grams which is 97 percent of theoretical yield.

The structure of the product was determined by reacting a small portion with piperidine and the reaction product was identified as tertiary-butylsulfenyl piperidine. The reaction with piperidine is characteristic of sulfenyl thiocyanates and in the present case yielded the well-known product.

Example II

One mol (166 grams) of tertiary-heptylsulfenyl chloride was prepared from ditertiary-heptyl disulfide and chlorine in the presence of a solvent. To the solution of the sulfenyl chloride was added a molar equivalent of potassium thiocyanate. A yield of 129 grams (69 percent of theory) of tertiary-heptylsulfenyl thiocyanate was recovered. The product which comprised a mixture of isomeric tertiary-heptylsulfenyl thiocyanates was stable when distilled at reduced pressure and showed no noticeable decomposition after standing for several days at room temperature.

Example III

Three reaction vessels were charged with 200 ml. of cyclohexane and to each of the reactors was added 30 grams of tertiary-butylsulfenyl thiocyanate. To the first reactor was also added 1 ml. of concentrated sulfuric acid and to the second reactor was added 2 grams of trimethyl benzyl ammonium hydroxide (Triton-B). The three systems were heated until refluxing steadily and maintained under this condition for two hours. The reactor contents were then separately removed and fractionated to observe the effects, respectively, of the elevated temperature, of the strong acid and of the strong base on the thiocyanate. The results are tabulated below:

| Run | Solvent | Additive | Thiocyanate Recovery, per cent |
|---|---|---|---|
| 1 | Cyclohexane | $H_2SO_4$ | 80 |
| 2 | do | Triton-B | 85 |
| 3 | do | None | 95 |

The recovery of the undecomposed sulfenyl thiocyanate after the above treatments easily shows the stability of the tertiary-alkylsulfenyl thiocyanate under drastic conditions.

Example IV

Samples of n-butyl-sulfenyl thiocyanate and tertiary-butyl-sulfenyl thiocyanate were prepared in isopentane solution from the interaction of the corresponding sulfenyl chlorides with sodium thiocyanate.

Decomposition of the n-butyl sulfenyl thiocyanate was readily observed in the pentane solution as evidenced by the deposition of sulfur. This sulfur was removed by filtration and the isopentane attempted to be removed by distillation. The decomposition of the product was so pronounced, however, that fractionation was discontinued. The crude n-butyl-sulfenyl thiocyanate was allowed to stand at room temperature for six hours during which time extensive decomposition occurred as indicated by a heavy precipitation of sulfur.

The tertiary butylsulfenyl thiocyanate showed no decomposition upon preparation nor during the distillation of solvent or subsequent fractionation of the product. The distilled product was stored for several months at room temperature with no precipation of sulfur or other apparent degradative change.

From the foregoing examples it may be observed that substantially quantitative yields of tertiary-alkylsulfenyl thiocyanates may be prepared by the interaction of corresponding tertiary-alkylsulfenyl halides with metal salts of thiocyanic acid. Contrary to expectations, the resulting tertiary-alkylsulfenyl thiocyanate may be readily recovered and stored without decomposition or degradation changes. The experiments demonstrate conclusively the stability of these compounds during storage and under drastic chemical and physical treatment. This unexpected characteristic property of stability of these novel compounds allows them to be employed for numerous uses in which the unstable sulfenyl thiocyanates previously known are unsatisfactory.

As many widely different embodiments of this invention may be made without departing from the spirit and scope thereof, it is to be understood that this invention is not limited to the specific embodiments and examples disclosed herein.

We claim:

1. A compound of formula R—S—SCN in which R represents a tertiary-alkyl radical of the configuration

wherein R′, R″, and R‴ are alkyl groups.

2. A compound according to claim 1 in which R is a tertiary-alkyl radical from the group consisting of four to twenty carbon atoms.

3. As a novel composition of matter, a tertiary-alkylsulfenyl thiocyanate.

4. As a novel composition of matter, tertiary-butylsulfenyl thiocyanate.

5. As a novel composition of matter, tertiary-heptylsulfenyl thiocyanate.

6. A process which comprises, reacting a tertiary-alkylsulfenyl halide selected from the group consisting of tertiary-alkylsulfenyl chlorides, tertiary-alkylsulfenyl bromides and tertiary-alkylsulfenyl iodides with a thiocyanate of a metal selected from the groups consisting of alkali metals and alkaline earth metals in the presence of an organic liquid which is inert to said reactants and in which said tertiary-alkylsulfenyl halide is soluble, and separating and recovering a resulting tertiary-alkylsulfenyl thiocyanate as a product of the process.

7. The process of claim 6 wherein said reacting is carried on at a temperature of from $-10°$ to $50°$ C. and for a period of time of from 0.5 to 1.5 hours.

8. The process of claim 6 wherein said organic liquid is a low-boiling hydrocarbon solvent.

CHESTER M. HIMEL.
LEE O. EDMONDS.

REFERENCES CITED

The following references are of record in the file of this patent:

UNITED STATES PATENTS

| Number | Name | Date |
|---|---|---|
| 2,462,433 | Searle | Feb. 22, 1949 |

OTHER REFERENCES

Gilman: "Organic Chemistry," vol. 1 (2nd ed., 1943), pp. 920–923.